(12) United States Patent
Skierkiewicz

(10) Patent No.: US 7,891,724 B2
(45) Date of Patent: Feb. 22, 2011

(54) SAFETY WINDOW IN FOLDABLE CAB DOOR

(75) Inventor: Joseph Skierkiewicz, Westchester, IL (US)

(73) Assignee: Auto Glass Plus, Arlington Heights, IL (US)

( * ) Notice: Subject to any disclaimer, the term of this patent is extended or adjusted under 35 U.S.C. 154(b) by 0 days.

(21) Appl. No.: 12/056,126

(22) Filed: Mar. 26, 2008

(65) Prior Publication Data

US 2009/0243332 A1 Oct. 1, 2009

(51) Int. Cl.
*B60J 1/16* (2006.01)
(52) U.S. Cl. .................................................. 296/146.2
(58) Field of Classification Search ............ 296/146.11, 296/146.12, 146.15, 146.16; 49/501, 502, 49/413, 410, 411
See application file for complete search history.

(56) References Cited

U.S. PATENT DOCUMENTS

| | | | | |
|---|---|---|---|---|
| 2,701,162 A | * | 2/1955 | Kliger | 52/204.51 |
| 2,721,361 A | * | 10/1955 | Ryan et al. | 52/204.51 |
| 5,228,740 A | * | 7/1993 | Saltzman | 296/146.1 |
| 5,791,727 A | | 8/1998 | Doescher et al. | |
| 5,799,449 A | | 9/1998 | Lyons et al. | |
| 6,016,861 A | * | 1/2000 | Davis | 160/105 |
| 6,018,913 A | | 2/2000 | Lin | |
| 6,572,176 B2 | | 6/2003 | Davis et al. | |
| 6,902,224 B2 | * | 6/2005 | Weinert et al. | 296/146.16 |
| 7,003,916 B2 | | 2/2006 | Nestell et al. | |
| 7,029,055 B2 | | 4/2006 | Bourque et al. | |
| 7,073,293 B2 | | 7/2006 | Galer | |
| 7,185,943 B2 | | 3/2007 | Lesle et al. | |
| 7,219,470 B2 | | 5/2007 | Lahnala | |

* cited by examiner

*Primary Examiner*—H Gutman
(74) *Attorney, Agent, or Firm*—Vedder Price PC

(57) ABSTRACT

In combination, a foldable door assembly and sliding window assembly for vehicles is disclosed. The combination allows the driver of the vehicle to see through the window assembly, open it, and adjust a rearview mirror allowing operation of the vehicle with the foldable door to be in the closed position. The door assembly has a first section and a second section hingeably connected to one another. The second section rotates and folds against the first section. The first section has a rear edge hingeably connected to a truck body so that the first section of the door assembly rotates to an open position onto the truck body from a closed position. The first section defines an opening for placement of a frame having a track which holds a sliding window.

1 Claim, 3 Drawing Sheets

SAFETY WINDOW IN FOLDABLE CAB DOOR

BACKGROUND OF THE INVENTION

1. Field of the Invention

This invention relates to a combined foldable door and slidable window on a cab for motor vehicle. The window is placed on a cab door for allowing a driver to open the window and adjust an outside mirror without opening the door. The door can be safely closed when operating the vehicle rather than being left open to make repeated adjustments to the mirror.

2. Description of the Related Art

Sliding window assemblies are known for insertion in vehicle doors, roofs, and the back of cabs of trucks. They may be constructed in a modular assembly, which typically means a window construction assembled separately from the final assembly of the motor vehicle and then installed in the vehicle.

There is a need for sliding window assemblies in foldable doors for cabs of trucks. The windows serve as a safety device on foldable cab doors. The foldable cab doors with conventional windows that do not open are typically placed in the open position so that the driver may adjust a rearview mirror on the side of the truck. Often, the door is left open during operation so the driver can repeatedly adjust the rearview mirror on the outside of the vehicle. When making frequent stops, the driver may also exit and enter the vehicle with the door folded open and leave it open when operating the vehicle. This practice is hazardous, and the placement of a slidable window in the foldable door would provide safety benefits.

The related art discloses sliding windows only and not in combination with a foldable door of a vehicle. U.S. Pat. No. 5,791,727 discloses a window in the cab of a combine, which is aligned with the window in a harvest bin so that the interior of the harvest bin can be viewed by the combine operator. The window in the cab is pivotally mounted about a horizontal axis near the bottom of the window so it can be opened to clean the outside surfaces of the cab in the harvest bin.

U.S. Pat. No. 5,799,449 discloses a modular sliding window assembly for a motor vehicle body with a sliding pane subassembly having a snap-fit with a frame subassembly. The subassembly comprises a pair of fixed panes, an upper and lower appliqué, and an injection-molded cover member integrating the fixed panes and the appliqués. The sliding pan subassembly comprises a generally horizontal run channel member and at least one glazine pane and optionally a run channel guide affixed to a peripheral edge of the pane. The appliqués have a flexible flange extending inward from the injection-molded cover member, forming a step ridge. The run channel members provides a correspondingly configured feature so that the snap-fit established by the step of a flexible flange.

U.S. Pat. No. 6,018,913 discloses a sliding window assembly having a guide track and sliding pane geometry that ensures that the sliding pane maintains a vertical, untilted orientation when it is slid along the guide track to a closed position.

U.S. Pat. No. 7,073,293 discloses a rear window assembly for a vehicle comprising a first fixed pane, a second fixed pane, a sliding pane, which is supported for horizontal movement between open and closed positions in a drive assembly. The assembly includes a support system that supports the fixed panes in a manner to define a central opening. The system further includes a carrier that supports the sliding pane for horizontal movement and further provides an enhanced engagement between the sliding pane and the drive assembly.

In view of the foregoing and other related art, there is no disclosure of the combination of a foldable cab door with a sliding window assembly, the use of which would provide safety features to a driver operating the vehicle. The driver, with the present invention, is able to close the foldable door and look through the window, open it, and adjust a rearview mirror while moving the vehicle.

SUMMARY OF THE INVENTION

Accordingly, the present invention provides a combined window and door assembly that includes a window having one or more fixed panes and one or more flexible sliding panes, which is particularly suitable for use on a foldable door of a vehicle, such as a step van, garbage truck, or delivery truck.

The purpose of the present invention is to provide a new and improved window and door assembly for the cab of a vehicle, primarily a truck. An illustrative embodiment of the concepts of the present invention is shown in the drawings and makes use of the combined, foldable door assembly having first and second sections, wherein the first section defines an opening for receiving a sliding window assembly. The window assembly includes tracks for reception of fixed and sliding panes and retaining pins for maintaining the fixed pane and moveable pane securely in the track. The sliding pane may be moved from a closed to open position and back in a separate track. The use of the sliding window assembly in the foldable door eliminates the requirement of keeping the prior art foldable door in an open position when the operator is driving the truck so the operator may frequently adjust a rearview mirror located outside the cab of the truck. Typically, the operator enters and exits the truck, which necessitates the foldable door to be placed in an open position. Rather than drive the truck with the door open to adjust the mirror, the door can be closed and the slidable window utilized for visibility and for adjusting the mirror.

There has been outlined, rather broadly, the more important features of the invention in order that the detailed description thereof, which follows, may be better understood, and in order for the present contribution to the art be better appreciated. There are additional features of the invention that will be described hereinafter that will form the subject matter of the claims appended hereto. In this respect, before explaining at least one embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the terminology employed herein is for the purpose of description and should not be regarded as limiting. As such, those skilled in the art will appreciate that the conception, upon which this disclosure is based, may be utilized as the basis for the designing of other structures for carrying out the purposes of the present invention. It is important, therefore, that the claims be regarded as including such equivalent constructions insofar as they do not depart from the spirit and scope of the present invention.

It is therefore an object of the present invention to provide a new and improved window and foldable door assembly for vehicles that allows the vehicle to be driven with the foldable door placed in the closed position providing a window assembly with a slidable window, which is typically positioned in an open position when the vehicle is in operation.

It is another object of the present invention is to provide a foldable door assembly and window assembly that are of a durable and reliable construction.

An even further object of the present invention is to provide a one-piece window assembly for fitting within the foldable door assembly.

Another object of the present invention is to provide a slidable window assembly in a foldable door, which when the door is in a closed position allows the operator of the vehicle to adjust a rearview mirror attached on the side of the truck.

These objects, together with other objects of the invention and with various features of novelty that characterize the invention, are pointed out with particularity in the claims annexed hereto and forming a part of this disclosure. For a better understanding of the invention, its operating advantages, and the specific objects obtained by its uses, reference should be made to the accompanying drawing and descriptive matter in which there are illustrated preferred embodiments of the invention.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
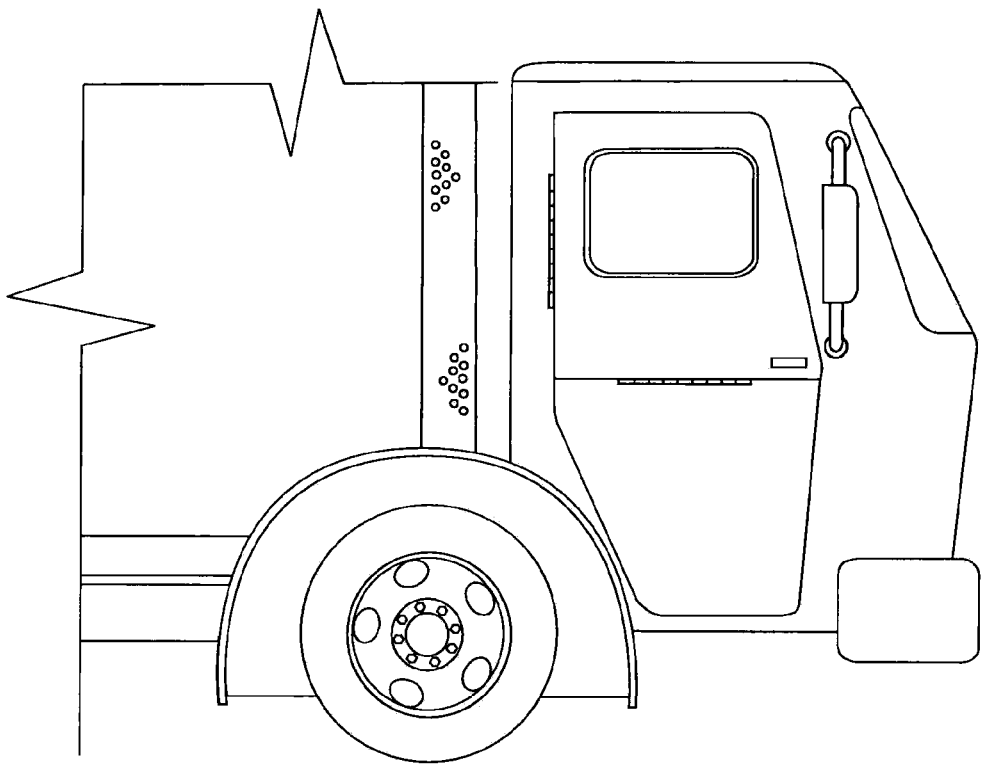
FIG. 1 is a side view of a cab of a prior art vehicle having a foldable door in a closed position with closed window that does not open.
Figure 2:
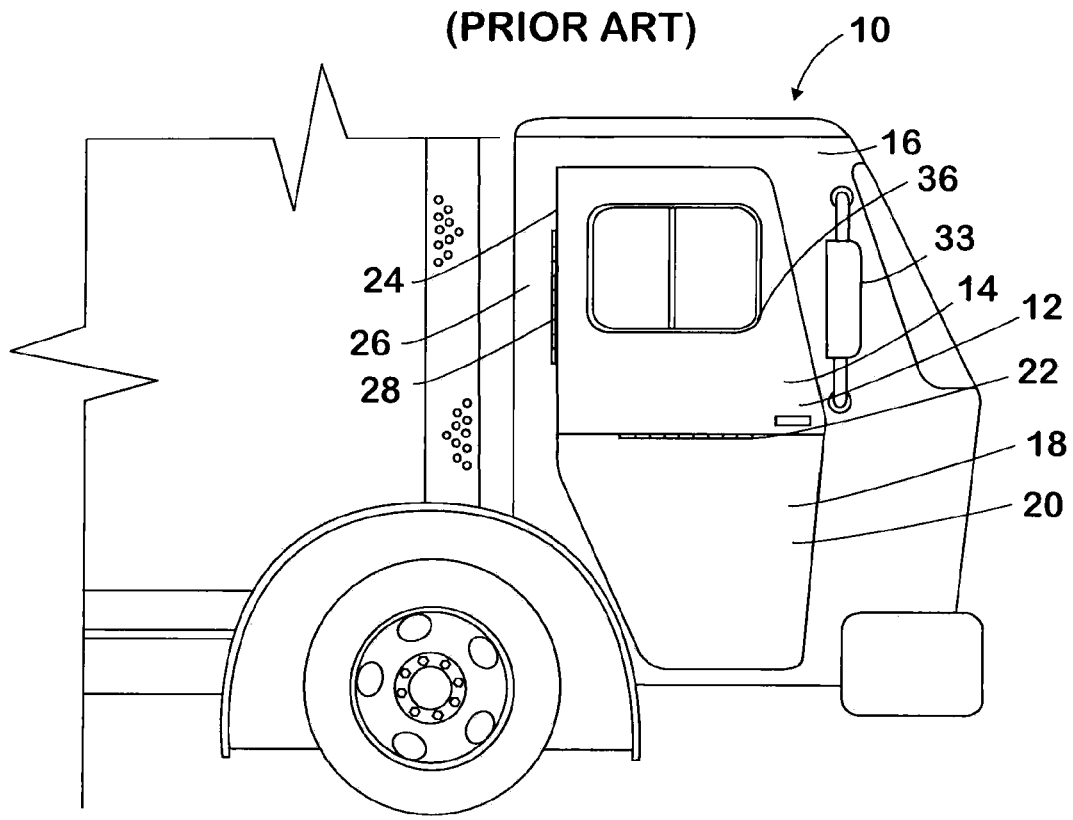
FIG. 2 is a side view of a foldable door with a window placed in the upper section of the door.
Figure 3:
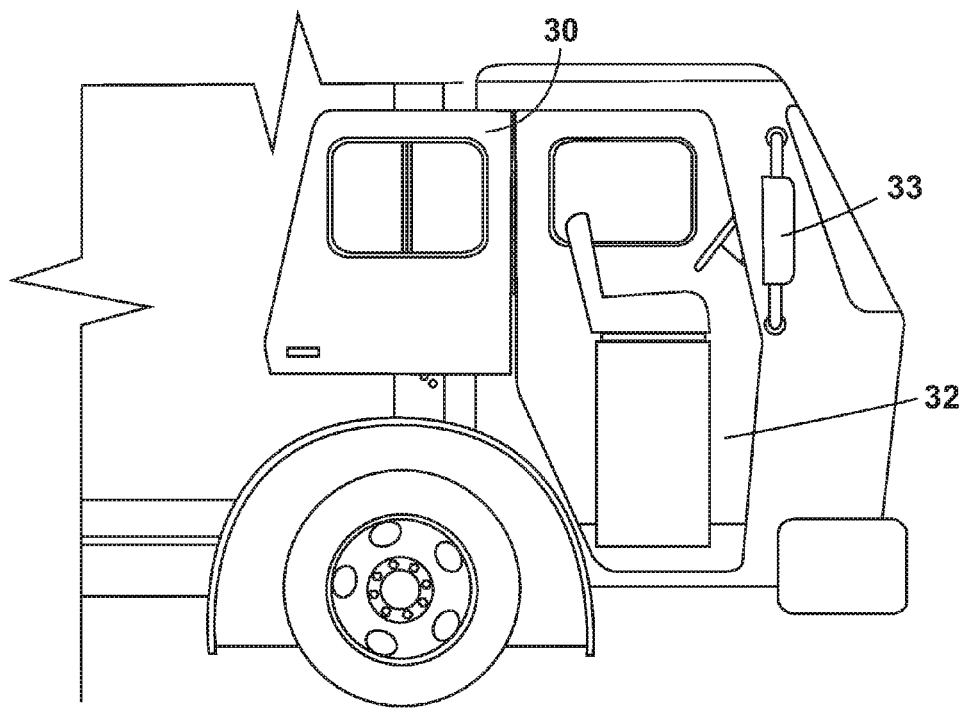
FIG. 3 is a side view of a foldable door in an open position with a window included in the upper section.

With reference now to the drawings, and in particular to FIG. 1 thereof, a prior art foldable door is shown. The door may be folded and attached to the vehicle so that the operator may exit and enter the vehicle when the door is in the open position. Typically, the door is in the open position while the operator drives the vehicle, for there is no openable window present. This position creates a hazard in that the operator may be displaced from the vehicle through the open door during operation of the vehicle. The open door is required so that the operator may adjust the outside rearview mirror and exit and enter the vehicle on a frequent basis when it is stopped.

FIGS. 2-6 illustrate a new and improved foldable door 12 and slidable window assembly 34 embodying the principles and concepts of the present invention and generally designated by the reference numeral 10. Door 12 is in a closed position.

More specifically, it will be noted that the first embodiment 10 of the invention includes a foldable assembly door 12 on a cab of a vehicle. Foldable door assembly 12 includes a first section 14 on the upper side 16 of the door and a second section 18 on a lower side 20 of the door. The two sections are pivotably connected by a hinge 22 which allows the lower side 20 to be rotated upward about 180° to meet the upper side 16. The upper side 16 and lower side 20 are engaged by a lock, not shown.

Foldable door assembly 12 can be folded again. Rear edge 24 of upper side 16 is pivotably connected with truck body 26 by vertically oriented hinge 28. The hinge 28 allows the folded door to rotate to an open position, which is about 180° from a closed position forming opening 32.

Folded door 30 is attached to truck body 26 by a lock which is not shown in an open position. With folded door 30 open, the operator can leave and re-enter the vehicle with ease while performing tasks such as delivery items or attending to receptacles holding garbage. When it is time to drive long distances, the foldable door of the prior art is often left open so the operator could watch for traffic and adjust side view mirror 33. The open door creates a hazardous condition for the operator.

Accordingly, the present invention eliminates the safety risk presented by the hazardous driving with the prior art foldable door being open by providing a slidable window assembly 34 in the foldable door assembly 12. First section 14 on upper side 16 of foldable door assembly 12 defines an opening 36 for slidable window assembly 34. Frame 38 of window assembly 34 is adapted and fitted into foldable door assembly 12 at opening 36.

Frame 38 as shown in FIGS. 4-7 includes a flange 40, which is perpendicularly oriented from base 42. Base 42 is secured on upper side 16 of first section 14 of door 12. It fits in opening 36 of the door. Base 42, opposite flange 40, forms downward member 44, which is oriented downwardly and perpendicular to base 42 and parallel to outer surface 46 of upper side 16 of door 12. Corner 48 formed by the juncture of flange 40 and base 42 is typically at an angle of about 90 degrees. At the opposite end of base 42 is inside corner 50. The corner has an angle of approximately 90 degrees and is formed by the juncture of downwardly oriented member 44 and base 42. Corner 50 is on the obverse side 42A of base 42. The top side 42B of base 42 is exposed to outside corner 48. This arrangement of opposed and oppositely oriented right angles causes the structure of the flange 40, base 42, and member 44 to securely fit in opening 36 of upper side 16 of door 12 and provides a solid inner frame 52 for securing frame 38 and window assembly 34 in door 12. Inner frame 52 includes U-shaped member 54 for holding fixed pane 56A in first track 58 and moveable pane 56B is contained in second track 60 of U-shaped member 54. The U-shaped member establishes the periphery of the fixed and moveable panes by first wall 62 and base 64 connected to the outer wall 66. Outer wall 66 is the basis for outer frame 68, which is part of window frame 38. Outer frame 68 has upper portion 70 for securing the windows and lower portion 72, which is parallel to downwardly oriented member 44. A sealer 74 is positioned between lower portion 72 and upper side 16 of the door. The sealer may be any suitable material that will prevent moisture, dirt, and contaminants from entering the area between the lower portion 72 and upper side 16 of the door that may corrode or rust of the door. The moveable pane 56B slides readily in track 60. Downwardly oriented member 44, which runs parallel to outer frame lower portion 72 on the opposite side of upper side 16 of the door is attached to the lower portion by pins and screws not shown.

The sliding moveable pane 56B is aided by a cushion material 76 located in the bottom 77 of track 60. It is also present in the bottom 78 of track 58 for securely holding fixed pane 56A. Cushion material 76 extends upwardly along the sides of each glass pane forming a U-shaped structure providing a secure fit.

Flange 40 of frame 38 readily accepts pin 80 for securing the window assembly 34 into the upper side 16 of foldable door assembly 12. Pin 80 passes through flange 40 on inner frame 52 in multiple locations. Frame 38 is secured by additional pins at various locations around the periphery of window assembly 34 on the inside and outside of door assembly 12. Further, pin 80 passes into U-shaped member 54 for securing it and panes 56A and 56B. Inner frame 52 and outer frame 68 are operatively associated to encircle panes 56A and 56B.

Figures 4, 5:
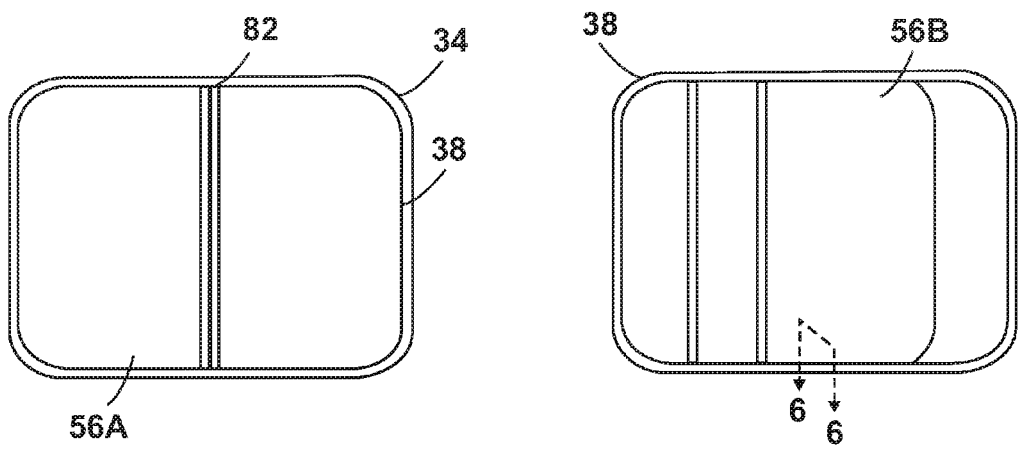
FIG. 4 is a side view of a sliding window assembly.
FIG. 5 is a side view of a sliding window assembly with a sliding pane in an open position.
Figure 6:
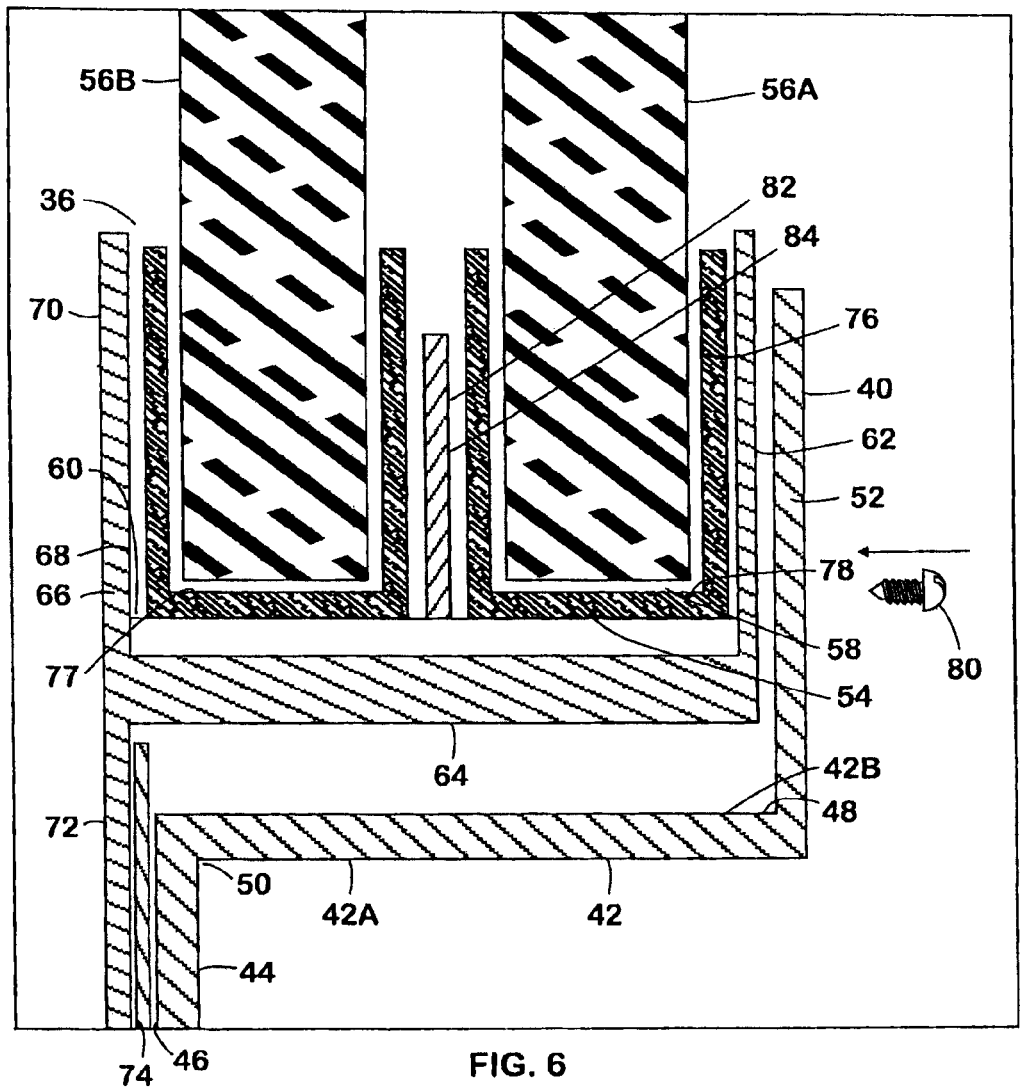
FIG. 6 is a cross-sectional view along line 5-5 of FIG. 4 showing the slidable pane and stationary window pane window placed in the window assembly connected to the door of the vehicle.

FIGS. 4 and 5 show the slidable window assembly 34 with moveable pane 56B, and fixed pane 56A. Post 82 bridges fixed pane 56A and moveable pane 56B and frictionally seals moveable pane 56B as it slides past post 82 for the entire height of the window. When the moveable pane 56B is in the closed position, post 82 prevents air, dust and moisture from entering the window assembly. Further, a seal 84 is provided on both sides of post 82, which can be made of a suitable plastic or rubber, prevents air, moisture, and dust from entering the perimeter of window assembly 34.

In operation, the foldable door assembly 12 is not required to be placed in the position of folded door 30. The vehicle operator may see through panes 56A and 56B to observe traffic and rearview mirror 33. For facile adjustment of the mirror, the operator does not have to open and fold door assembly 12 but merely slides pane 56B backwards into an open position. When desired, pane 56B can be slid forward into a closed position. The window assembly 34 obviates the need to open and fold door 12 to adjust the mirror. The only need to open door assembly 12 is for exiting and entering the vehicle.

With respect to the above description it is to be understood that variations in size, material, shape, form, function and manner of operation, assembly and use, are deemed readily apparent and obvious to one skilled in the art, and all equivalent relationships to those illustrated in the drawings and described on the specification are intended to encompassed by the present invention.

Therefore, the foregoing is considered as illustrative only of the principles of the invention. Further, since numerous modifications and changes will literally occur to those skilled in the art, it is not desired to limit the invention to the exact construction and operation shown and described, and accordingly, a suitable modifications and equivalents may be resorted to, falling within scope of the invention.

What is claimed is:

1. In combination, a foldable door for a vehicle and a sliding window assembly contained therein consisting of:
    a door having a first section on an upper side of the door and a second section on a lower side of the door hingeably connected to one another so that the second section rotates and folds against the first section;
    a rear edge of the first section hingeably connected to a truck body so that the first section of the door rotates to an open position onto the truck body from a closed position;
    the first section defining an opening for placement of a sliding window assembly with two windows, a single fixed pane and a single slidable fixed pane, the single fixed pane in a first U-shaped track and the single slidable pane in a second U-shaped track parallel to the first track and a U-shaped member defining the periphery of the single fixed pane and slidable pane within the opening, wherein said opening is positioned such that movement of the slidable pane to an open position and closed position is operable by an operator; and
    the U-shaped member having the single fixed pane in the first U-shaped track and the second U-shaped track containing the single slidable pane in which the slidable pane is moved towards the fixed pane for opening the window wherein the slidable pane is adjacent and parallel to the fixed pane when in the open position, said U-shaped first and second tracks containing U-shaped cushioning material for securely holding the sliding and fixed panes, said U-shaped member is positioned inside an inner and outer frame for supporting the first and second U-shaped tracks for holding the fixed pane and slidable pane, said inner and outer frame comprises a flange, base, and downwardly oriented member for securing the U-shaped member in the door, wherein the flange and base form a first angle of about 90 degrees wherein a second angle is on an obverse side of the base and the downwardly oriented member forms the second angle with the obverse side of the base and wherein the second angle is about 90 degrees.

* * * * *